G. THOMAS.
VEHICLE BOW SPRING.
APPLICATION FILED JULY 22, 1913.
1,101,586.
Patented June 30, 1914.
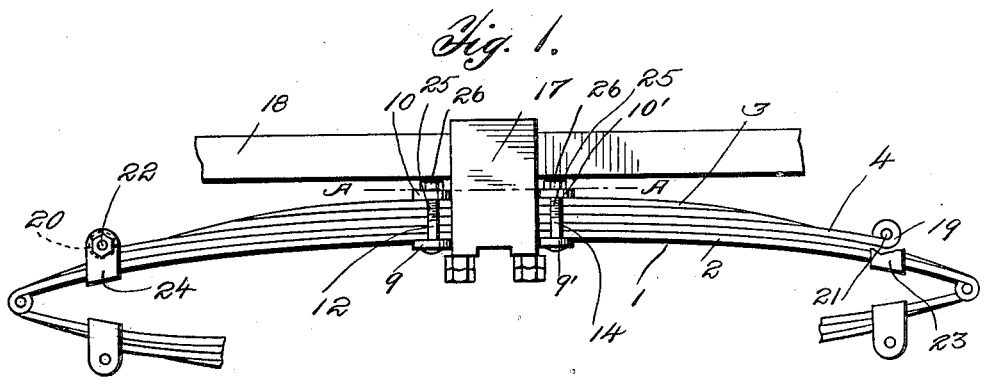
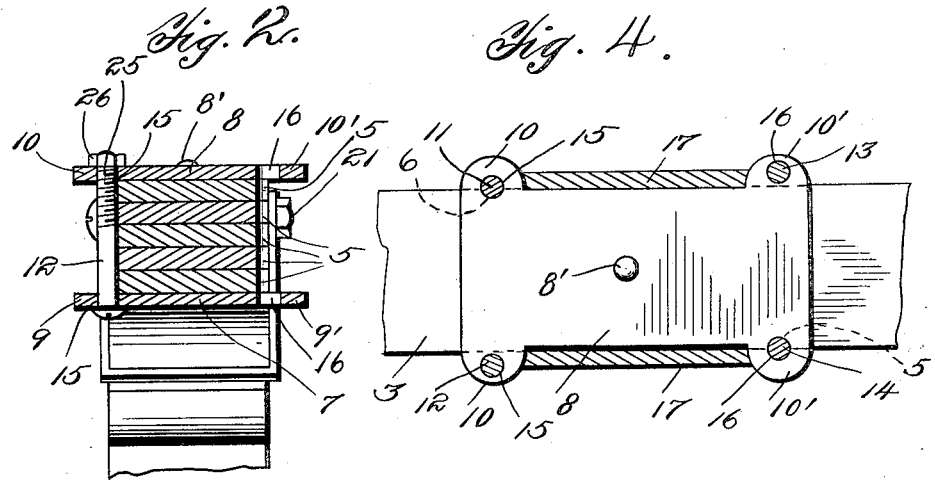
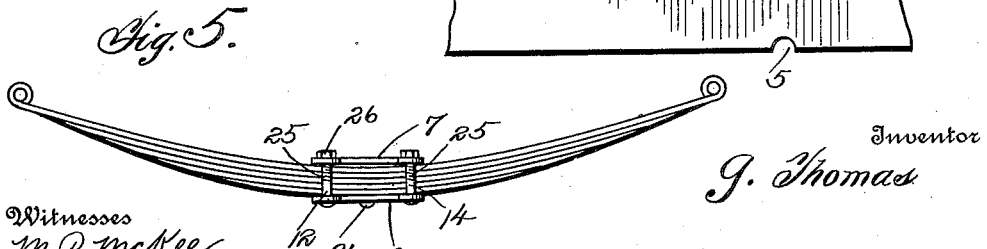
Witnesses
M. P. McKee
Max C. Louis
Inventor
G. Thomas
By Alex. J. Wedderburn, Jr.
Attorney
COLUMBIA PLANOGRAPH CO., WASHINGTON, D. C.

UNITED STATES PATENT OFFICE.

GEORGE THOMAS, OF PITTSBURGH, PENNSYLVANIA.

VEHICLE BOW-SPRING.

1,101,586. Specification of Letters Patent. Patented June 30, 1914.

Application filed July 22, 1913. Serial No. 780,493.

*To all whom it may concern:*

Be it known that I, GEORGE THOMAS, a citizen of the United States, residing at Pittsburgh, in the county of Allegheny and State of Pennsylvania, have invented certain new and useful Improvements in Vehicle Bow-Springs, of which the following is a specification.

This invention relates to improvements in vehicle bow springs and has for its object to provide means for reinforcing the central portion of the spring.

Another object of the invention is to provide a combined holding and reinforcing clip for the leaves of a bow spring.

With the above and other objects in view, which will be more fully explained in the following specification, I have invented the device illustrated in the accompanying drawings in which—

Figure 1 is an elevational view of one form of my improved spring, shown partly broken away, Fig. 2 is an enlarged irregular vertical sectional view of the central portion of a bow spring, Fig. 3 is a plan view of a reinforcing plate, Fig. 4 is a sectional view on line A—A of Fig. 1, and Fig. 5 is an elevational view of another form of the device.

Like reference characters indicate like parts throughout the specification and in the several views in the drawings in which—

1 indicates a bow vehicle spring consisting of a series of leaf springs 2, 3, 4, etc. Alining notches 5 are provided on one edge of each of the leaf springs to one side and away from the center thereof, and alining notches 6 are provided on the opposite edge of each of said leaf springs, but diagonally disposed from said first notches and away from the center of said springs.

A pair of plates 7 and 8 having ears 9 and 9' and 10 and 10' at each of their four corners are disposed on the upper and lower central portions of the spring 1 and are connected together by four bolts 11, 12, 13 and 14 which extend through opposing openings 15 and 16 in said ears 9 and 10, the bolts 11 and 14 extending into the notches 5 and 6 respectively whereby the leaf springs are held against slipping upon each other.

The plates 7 and 8 are elongated whereby the entire central portion of the spring 1 is reinforced and its parts securely held together whereby considerable strain is relieved from the weakest part of the spring, the part that usually gives away first or breaks from overstrain. I have found that by strengthening the spring in the manner above described the life of a bow spring is more than doubled. The ears 9, 9', 10 and 10' extend beyond the sides of the spring to receive the bolts 12 and 14 and these ears receive between them the clips 17 which support the vehicle frame 18 relative to the spring 1, said ears being spaced sufficiently apart to just permit the clips 17 to fit snugly therebetween thus holding the spring and frame in proper relation and against relative movement.

The plate 8 is provided on the central portion of its outer surface with an integral head 8' adapted to seat in a recess (not shown) provided in the axle 18', whereby the spring is held against slipping on said axle.

The leaf spring 4 has its ends 19 and 20 turned over the bolts 21 and 22 held by the clips 23 and 24 whereby the longer of the leaf springs are held together at all times in order to prevent the noise and wear incident to separating and hitting against one another on rebound.

The screw ends 25 of the bolts 12 and 14 project upwardly and through the upper plate 8 so that the nuts 26 thereon will be held against accidental displacement by the frame 18 which seats directly on said nuts. Should either of the plates 7 or 8 or any of the bolts holding them together become injured they may be readily replaced without having to renew the entire fixture.

Having now described my invention that which I claim to be new and desire to secure by Letters Patent is:—

1. The described device consisting of a series of spring leaves, a pair of plates embracing said leaves, a pair of ears on each side of each of said plates, each of said ears having openings therein, bolts extending through said openings whereby said plates and leaves are held together, one of said openings on one side of each of said plates being located beyond the plane of the sides of said leaves whereby the bolts passing through said latter openings will extend outwardly of said sides, other of said openings being located partially within the plane of said sides, and grooves in said sides alining with said latter holes whereby bolts extending through said latter holes lie partially within said grooves preventing longitudinal relative movement of said leaves.

2. The described device consisting of a series of spring leaves, a pair of plates embracing said leaves, a pair of ears on each side of each of said plates, each of said ears having openings therein, bolts extending through said openings whereby said plates and leaves are held together, one of said openings on one side of each of said plates being located beyond the plane of the sides of said leaves whereby the bolts passing through said latter openings will extend outwardly of said sides, other of said openings being located partially within the plane of said sides, and grooves in said sides alining with said latter holes whereby bolts extending through said latter holes lie partially within said grooves preventing longitudinal relative movement of said leaves, the grooves in one side of said leaves being diagonally disposed relative to the grooves in the other side thereof whereby transverse movement of said leaves is prevented.

3. The described device consisting of a series of spring leaves, a pair of plates embracing said leaves, a pair of ears on each side of each of said plates, each of said ears having openings therein, bolts extending through said openings whereby said plates and leaves are held together, one of said openings on one side of each of said plates being located beyond the plane of the sides of said leaves whereby the bolts passing through said latter openings will extend outwardly of said sides, other of said openings being located partially within the plane of said sides, and grooves in said sides alining with said latter holes whereby bolts extending through said latter holes lie partially within said grooves preventing longitudinal relative movement of said leaves, the grooves in one side of said leaves being diagonally disposed relative to the grooves in the other side thereof whereby transverse movement of said leaves is prevented, said ears and bolts being spaced apart forming a seat for a spring holding clip, said ears preventing relative horizontal movement between said device and clip.

In testimony whereof I affix my signature in presence of two witnesses.

GEORGE THOMAS.

Witnesses:
 EDWIN B. ROLL,
 NELLE HIGHTON.

---

Copies of this patent may be obtained for five cents each, by addressing the "Commissioner of Patents, Washington, D. C."